United States Patent
Cato et al.

(10) Patent No.: US 8,091,782 B2
(45) Date of Patent: Jan. 10, 2012

(54) USING CAMERAS TO MONITOR ACTUAL INVENTORY

(75) Inventors: Robert Thomas Cato, Raleigh, NC (US); Thomas Guthrie Zimmerman, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 726 days.

(21) Appl. No.: 11/937,095

(22) Filed: Nov. 8, 2007

(65) Prior Publication Data

US 2009/0121017 A1   May 14, 2009

(51) Int. Cl.
*G06F 19/00* (2006.01)
*G06Q 30/00* (2006.01)
*G06Q 90/00* (2006.01)

(52) U.S. Cl. ............... 235/385; 235/487; 705/28
(58) Field of Classification Search ............ 235/385, 235/375, 487; 705/28, 14
See application file for complete search history.

(56) References Cited

U.S. PATENT DOCUMENTS

| | | | |
|---|---|---|---|
| 6,738,687 B2 | 5/2004 | Hanel | |
| 6,746,029 B2 | 6/2004 | Chu et al. | |
| 7,693,757 B2 * | 4/2010 | Zimmerman | 705/28 |
| 2002/0035522 A1 | 3/2002 | Pilcher | |
| 2005/0269412 A1 * | 12/2005 | Chiu et al. | 235/462.03 |
| 2009/0063306 A1 * | 3/2009 | Fano et al. | 705/28 |

FOREIGN PATENT DOCUMENTS

| | | |
|---|---|---|
| JP | 10-035827 | 2/1998 |
| JP | 2002-284309 | 10/2002 |
| JP | 2004-010201 | 1/2004 |
| JP | 2004-196439 | 7/2004 |
| WO | WO 01/31546 | 5/2001 |

OTHER PUBLICATIONS

Novel Applications of Sunshiny Markers, 9 pages, Jun. 2003, Germany.

* cited by examiner

*Primary Examiner* — Edwyn Labaze
(74) *Attorney, Agent, or Firm* — Thomas E. Tyson; Jeffrey L. Streets (57) ABSTRACT

System and method for monitoring inventory. Inventory items are positioned between a camera and a surface having an optically identifiable and distinct characteristic. The camera obtains an image of the inventory items present, any exposed portion of the surface, or both. The amount of the exposed surface is used to determine an amount of the inventory items that are present or missing. Furthermore, the optically identifiable characteristic may be a uniform characteristic, such as color or texture, or a set of discrete elements, such as stickers, barcodes, structural features of the shelf, a pattern of lines or shapes, or combinations thereof. Optionally, the optically identifiable characteristic is unique to the location of the shelf associated with the inventory items. Inventory or non-inventory items incorrectly positioned over the exposed surface may be excluded from the amount of the expected inventory item being determined if the item does not match the visual attributes of the expected inventory item. The camera may be fixed or movable and preferably provides digital images to a computer system having a computer readable medium with program products for analyzing the image and providing inventory reports.

25 Claims, 4 Drawing Sheets

USING CAMERAS TO MONITOR ACTUAL INVENTORY

BACKGROUND OF THE INVENTION

1. Field of the Invention

The present invention relates to method and systems for monitoring inventory.

2. Description of the Related Art

Inventory is a list of good and materials, or those goods and materials themselves, held available in stock by a business. Manual inventories are often performed at the expense of employee time and wages, the risk of mistakes, and the inability to provide a real time inventory report. The frequency of a manual inventory will vary based upon the needs of a particular business and the rate at which the inventory is sold relative to the typical amount of inventory on hand at any particular point in time. Inventories are sometimes counted on a monthly basis to coincide with the end of the monthly accounting cycle so that detailed management reports can be prepared.

Barcodes are a machine-readable representation of information, most commonly seen as dark ink on a light background to create high and low reflectance. Originally, barcodes stored data in the widths and spacings of printed parallel lines, but today they also come in patterns of dots, concentric circles, and text codes hidden within images. Barcodes can be read by optical scanners called barcode readers or scanned from an image by special software. Bar codes have been widely implemented as a means for identifying goods as they are purchased, such as by scanning a Universal Product Code (UPC) at a checkout register. Accordingly, barcodes increase accuracy and speed at checkout. The barcodes are typically affixed or printed onto product packaging to be outwardly facing so that they are easily scanned. A barcode scanner is often in communication with a computer system that can quickly access additional product information, such as a brief description of the item and its price.

While barcodes are very beneficial for identifying an individual item that has been carried to a scanner, barcodes have not provided a complete answer to inventory management. Theoretically, it should be possible for a retailer, for example, to scan incoming inventory from the manufacturer, scan outgoing inventory as it is purchased by customers, and determine the current inventory as the difference between these two amounts. This approach may be sufficient in some applications, but it is subject to errors caused by theft, waste, breakage, and the like. As a result, periodic inventories of the merchandise that is actually within the store are still necessary to confirm the accuracy of inventory report prepared in this manner.

Therefore, there remains a need for an improved system and method for monitoring inventory. It would be desirable for the system and method to provide real time monitoring of inventory. It would also be desirable for the system and method to monitor the actual inventory so that theft, waste and breakage are taken into account.

SUMMARY OF THE INVENTION

One embodiment of the present invention includes a method for monitoring inventory. The method includes providing a surface having an optically identifiable characteristic that is distinct from an inventory item and directing a camera toward the surface. At least one unit of the inventory item is positioned between the camera and the surface in the normal course of business, wherein the at least one unit blocks the line of sight between the camera and the surface. The camera is used to obtain an image of the plurality of inventory items, an exposed portion of the surface or both. It is then possible to determine an amount of the exposed portion of the surface and determine the number of units of the inventory item present by comparing a known amount of the entire surface to the determined amount of the exposed portion of the surface. Preferably, the optically identifiable characteristic is selected from color, patterns of contrasting lines, patterns of contrasting shapes, bar codes, structural features of the shelf, or combinations thereof. Optionally, the optically identifiable characteristic is unique to the location of the shelf that may be logically associated with the inventory items in an inventory record.

In a further embodiment, the method further comprises identifying the location of an exposed portion of the shelf, and identifying inventory items previously positioned at the location of the exposed portion of the shelf. The location of the exposed portion of the shelf may be determined relative to a known position of the camera when the image was obtained. Alternatively, where the optically identifiable characteristic includes a plurality of uniquely identifiable labels, the method may further comprise establishing the location of each of the plurality of uniquely identifiable labels before positioning the at least one unit of the inventory item between the camera and the surface containing the plurality of uniquely identifiable labels. In a further option, the method may include associating an inventory item with the location of each of the plurality of uniquely identifiable labels.

In yet another embodiment, the invention provides a system for monitoring inventory. The system comprises a structure having a surface positioned for receiving at least one unit of an inventory item, wherein the surface has an optically identifiable characteristic that is distinct from the inventory item. A camera is directed toward the structure to obtain an image that includes the at least one unit of the inventory item, an exposed portion of the surface or both. The system further includes a computer system having a processor and a computer readable medium including computer usable program code for using the camera to obtain an image of the at least one unit of the inventory item, an exposed portion of the surface or both, determine an amount of the exposed portion of the surface, and determine the number of units of the inventory item present by comparing a known amount of the entire surface to the determined amount of the exposed portion of the surface. Optionally, the computer readable medium may further include computer usable program code for executing other steps of the method of the present invention.

In another embodiment, the invention provides a system for determining if at least one of an inventory item or an unknown object is placed so that it covers an incorrect portion of the surface. A database contains the visual attributes of the inventory item assigned to cover each portion of the surface. Once the surface is identified, the visual attributes of the items expected to be covering an assigned portion of the surface are compared with the visual attributes of the items observed covering the assigned portion of the surface. If the visual attributes do not match, then the portion of the surface covered by inventory or non-inventory items not matching the expected visual attributes is considered to be "uncovered" and the unmatching item is excluded for purposes of determining the number of units of the expected inventory item present. Optionally, a message can be generated to the store personnel informing them that said portion of the surface is covered by at least one incorrect inventory item or unknown object.

DETAILED DESCRIPTION OF PREFERRED EMBODIMENTS

The present invention includes systems and methods for monitoring inventory. The systems and methods may be implemented in various business environments, including, without limitation, retail stores, wholesale warehouses, and manufacturing plants. The systems and methods are particularly well suited for real time or near real time monitoring of actual inventory, such as the inventory of items that are present on a shelf structure within the store, warehouse, or plant facility. A particular advantage of the present invention is the ability to rapidly determine inventory levels without needing to positively identify each individual unit of inventory.

One embodiment of the invention provides a method for monitoring inventory. The method includes providing a surface having an optically identifiable characteristic that is distinct from an inventory item and directing a camera toward the surface. The surface may be a horizontal, vertical, tilted or curved, such as with a floor, wall, table, shelf, or a combination thereof. The surface is preferably provided with an optically identifiable characteristic by painting, papering, surfacing, or applying stickers. It is possible for the optically identifiable characteristic to be a natural surface feature of a structure, such as a color, texture or physical configuration. Furthermore, the optically identifiable characteristic may be a uniform characteristic, such as color or texture, or a set of discrete elements, such as stickers, barcodes, holes, or a pattern of lines or shapes. Optionally, the optically identifiable characteristic is unique to the location of the shelf that includes the exposed portion. The important aspect of the optically identifiable characteristic is that it is uniquely different than any inventory item and can be quickly distinguished from inventory items.

In accordance with the method, at least one unit of the inventory item is positioned between the camera and the surface in the normal course of business, wherein the units block the line of sight between the camera and the surface. In this manner, the units of the inventory item that are present reduce the amount of the surface that is exposed. Monitoring and observing the amount of the exposed surface indicates the amount or number of units of the inventory item that are present. Therefore, removal of a unit of an inventory item from its position will expose more of the surface and will be identified as a reduction in inventory of that item regardless of whether the unit was sold, broken, discarded or stolen.

The camera is directed toward the surface and used to obtain an image of the at least one unit, an exposed portion of the surface or both. The camera may be fixed or movable, such as through rotation, linear motion, or other motion directed by a user or automated controller. In order to easily communicate the image with a computer component of the system, the camera is preferably a digital camera. In some installations, the camera may beneficially include a high image resolution, such as between 1 and 10 megapixels, to improve the distinction between the surface and the inventory items. Furthermore, the camera may beneficially include a zoom lens to enable suitable resolution from convenient distances and positions for camera installation. It should be recognized, however, that the invention does not require that the camera have either a particular resolution or a zoom lens.

Furthermore, the camera may be instructed by an automated controller, such as a computer, to obtain images at various locations at various times. In one option, the camera may obtain images according to a set schedule, such as at the beginning and end of each day. In a further option, the controller may cause the camera to obtain images in response to activity detected in a particular area. The activity may be detected by identifying changes in an image or using motion sensors. However, the camera or a plurality of cameras may be used to obtain the images only when and where activity is detected. In this manner, inventory can be constantly updated without obtaining images throughout the store. Optionally, the camera may include signal processing capabilities that allow it to send only changes in the image relative to a previously obtained image.

It is then possible to determine an amount of the exposed portion of the surface and determine the number of units of the inventory item by comparing a known amount of the entire surface to the determined amount of the exposed portion of the surface. The image may be analyzed with conventional image processing techniques and software. Any format of the images, such as jpg, tiff, pdf or a digital negative, may be used within the scope of the invention. The image may be stored in memory and tracked by the date of the image and other identifying information, or the image may be immediately discarded or deleted from memory after having been used to make an inventory determination.

The known amount of the entire surface or the amount of exposed surface may be determined and tracked on the basis of absolute measurements or relative measurements. An absolute measurement could be made by fixing the distance and focus of the camera relative to the surface so that the camera's field of view had known dimensions. Alternatively, absolute measurements could be made by providing the surface with markings having a known spacing so that the markings can be equated to distance. However, the amount of exposed surface could also be determined as a relative amount, such as by determining that a designated area had a percentage of exposed surface area. After determining the percentage of exposed surface, a computer system with access to specific information about the inventory item expected to be in the designated area could calculate the number of units of that item that have been removed.

In a further embodiment, the method further comprises identifying the location of the exposed portion of the shelf, and identifying an inventory item previously positioned at the location of the exposed portion of the shelf. The location of the exposed portion of the shelf may be determined relative to a known position of the camera when the image was obtained. Alternatively, where the optically identifiable characteristic includes at least one uniquely identifiable label, the method may further comprise establishing the location of each uniquely identifiable label before positioning any units between the camera and the surface containing the plurality of uniquely identifiable labels. In a further option, the method may include associating an inventory item with the location of each of the plurality of uniquely identifiable labels, for example by establishing a logical association between the item and the label in a computer record. A computer system may maintain a database, listing or other records that cross-reference each inventory item with a location where the plurality of units of the inventory item is positioned. Locations identified by image analysis as no longer being occupied by units of inventory are used to search the inventory records and identify the inventory item that has been removed. Most preferable, the number of removed inventory units is also determined, for example using a dimensional analysis In yet another embodiment, the invention provides a system for monitoring inventory. The system comprises a structure having a surface positioned for receiving at least one unit of an inventory item, wherein the surface has an optically identifiable characteristic that is distinct from the inventory item. A camera is directed toward the structure to obtain an image that includes the at least one unit of the inventory item, an exposed portion of the surface, or both. The system further includes a computer system having a processor and a computer readable medium including computer usable program code for using the camera to obtain an image of the at least one unit, an exposed portion of the surface or both, determine an amount of the exposed portion of the surface, and determine the number of units of the inventory item present by comparing a known amount of the entire surface to the determined amount of the exposed portion of the surface. Optionally, the computer readable medium may further include computer usable program code for executing other steps of the method of the present invention.

Figure 1:
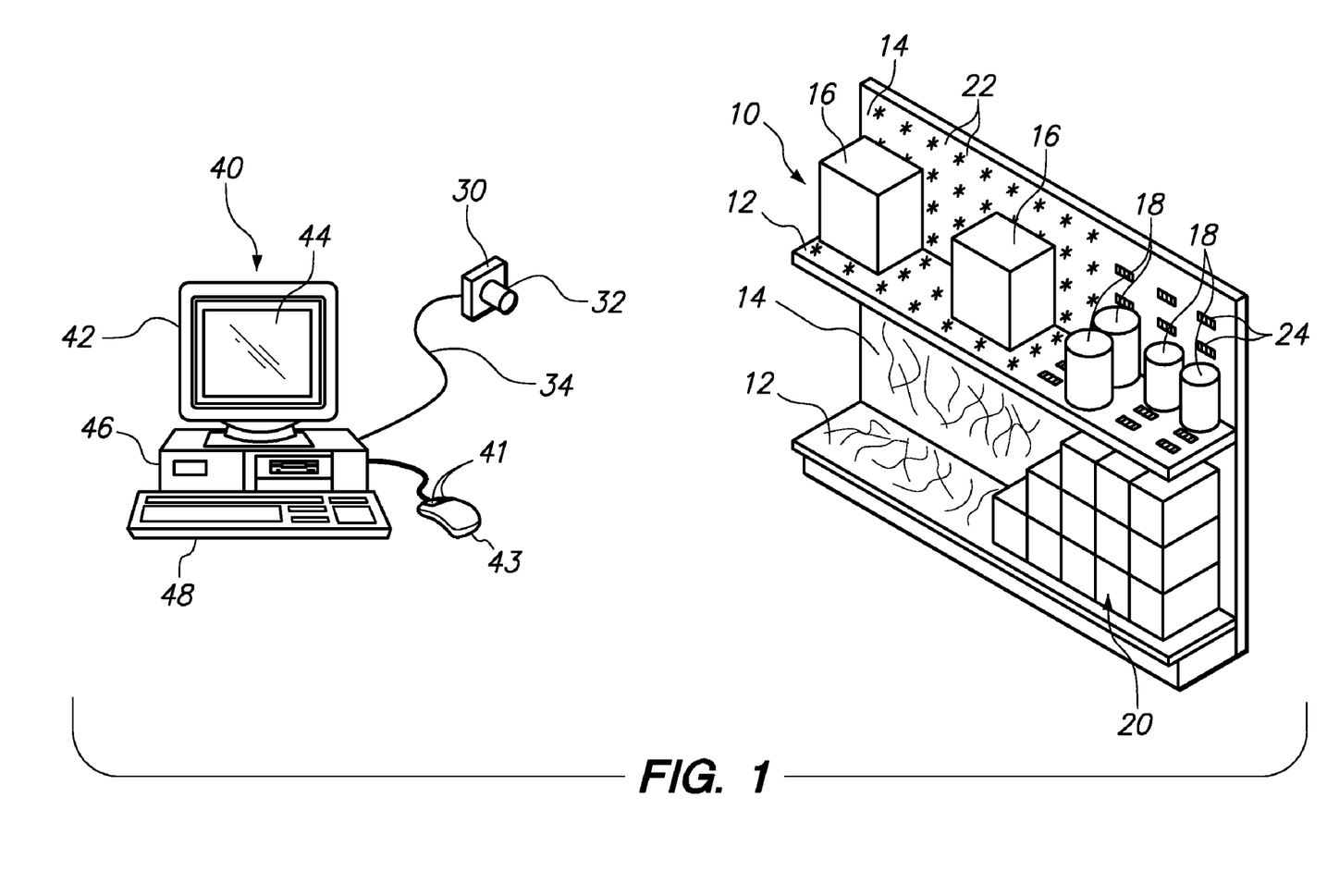
FIG. 1 is a diagram of a system for monitoring inventory in accordance with one embodiment of the present invention.

FIG. 1 is a diagram of a system for monitoring inventory in accordance with one embodiment of the present invention. A shelf structure 10 includes horizontal surfaces 12 and vertical surfaces 14 that receive inventory items 16, 18, 20. The surfaces 12, 14 are shown having three different optically identifiable characteristics, but an actual installation would most likely utilize the same type of characteristic for an entire shelf, an entire structure or the entire facility. As shown, the large boxes 16 are positioned to rest on the shelf surface 12 in front of the back surface 14, where both surfaces have discrete shapes 22 positioned at known uniform spacings. The cans 18 are positioned on the same shelf as the large boxes 16, but in an adjacent position. For illustration purposes, the surfaces 12, 14 that receive the cans 18 includes discrete barcodes 24 that may be used to identify the location of the shelf and/or to identify the inventory item that is represented by the cans 18. Furthermore, the lower shelf has surfaces 12, 14 that have a lined pattern that is easily distinguishable from the packaging of the smaller boxed inventory items 20 that rest on the shelf.

A digital camera 30 is positioned (structure not shown) in a fixed or movable manner in order to obtain images of the structure 10. Depending upon the specific method or inventory information being sought, the camera may obtain an image of the entire structure 10 or it may obtain one or more images of smaller regions, such as a separate image for each of the positions that are expected to contain a different inventory item 16, 18, 20. Accordingly, the camera 30 may include a zoom lens 32 that can be focused to limit the field of view to a designated portion of the structure 10. The camera 30 is in electronic communication with a computer system 40 through a cable 34 allows the downloading of images from the camera to the computer. Preferably, the same or different cable will enable the computer to pass instructions to the camera and/or any automated system for redirecting, repositioning, focusing and taking pictures with the camera.

In one embodiment, the back surface 14 comprises a retro-reflective material (e.g. 3M Diamond Grade Reflecting Tape Series 3990) and an infrared light illumination source is positioned substantially near the camera lens, optionally forming a part of the camera, so that the light from the illumination source is nearly in line with the camera lens, causing a strong return of light reflecting off the retro-reflective material. This system is able to obtain images with high contrast outlines of products against the back surface. The absence of an inventory item from the shelf results in a bright area, marking the void or exposed surface left by the absence of one or more units of the item. Bar code labels may be secured on the shelf edge to be read and decoded by the camera in order to identify the inventory item that is partially of fully out of stock, as units of the item are stocked behind a bar code identifying the item. The bar codes can be increased in size to increase the readability by the camera. U.S. patent application Ser. No. 11/325,952, filed on Jan. 5, 2006 and published as U.S. 2007/0152057, entitled Mobile Device Tracking is assigned to the assignee of the present application and is incorporated by reference herein.

A computer system 40 that is capable of receiving the digital images from the camera 30 includes a display device 42 (such as a monitor), a display screen 44, a cabinet 46 (which encloses components typically found in a computer, such as CPU, RAM, ROM, video card, hard drive, sound card, serial ports, etc.), a keyboard 48, and a mouse 43. The mouse 43 may have one or more buttons, such as buttons 41. Computer 40 is capable of passing instructions to camera 30 and/or any automated system for redirecting, repositioning, focusing and taking pictures with the camera.

Figure 2:
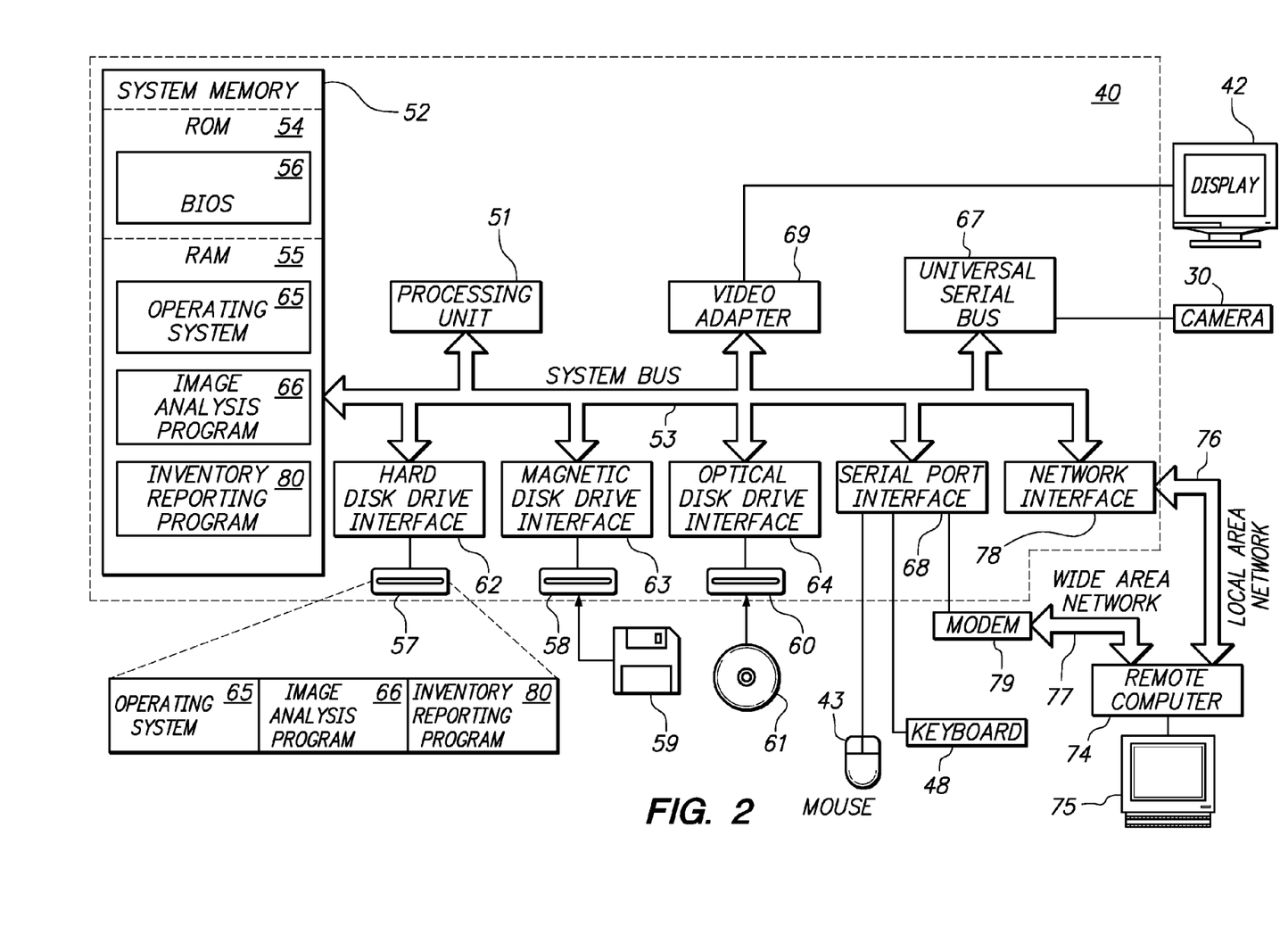
FIG. 2 is a schematic diagram of a computer system suitable for use in the system for monitoring inventory.

FIG. 2 is a schematic diagram of the computer system 40 in one configuration suitable for use in the system for monitoring inventory. The system 40 may be a general-purpose computing device in the form of a conventional personal computer. Generally, the personal computer 40 includes a processing unit 51, a system memory 52, and a system bus 53 that couples various system components including the system memory 52 to processing unit 51. System bus 53 may be any of several types of bus structures including a memory bus or memory controller, a peripheral bus, and a local bus using any of a variety of bus architectures. The system memory can include a read-only memory (ROM) 54 and random-access memory (RAM) 55. A basic input/output system (BIOS) 56, containing the basic routines that help to transfer information between elements within personal computer 40, such as during start-up, can be stored in ROM 54.

Computer 40 further includes a hard disk drive interface 62 for reading from and writing to a hard disk 57, a magnetic disk drive 58 for reading from or writing to a removable magnetic disk 59, and an optical disk drive 60 for reading from or writing to a removable optical disk 61 such as a CD-ROM or other optical media. Hard disk drive 57, magnetic disk drive 58, and optical disk drive 60 are connected to system bus 53 by a hard disk drive interface 62, a magnetic disk drive interface 63, and an optical disk drive interface 64, respectively. Although the exemplary environment described herein employs hard disk 57, removable magnetic disk 59, and removable optical disk 61, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for computer 40. For example, the operating system 65 and application programs, such as an image analysis program 66 and inventory reporting program 80 may be stored in the hard disk 57 or in RAM 55 of the computer 40.

A user may enter commands and information into personal computer 40 through input devices, such as a keyboard 48 and a pointing device, such as a mouse 43. Other input devices (not shown) may include a microphone, joystick, game pad, satellite dish, scanner, or the like. These and other input devices are often connected to processing unit 51 through a serial port interface 68 that is coupled to the system bus 53, but input devices such as a digital camera 30 may be connected by other interfaces, such as a parallel port, game port, a universal serial bus (USB) 67, IEEE 1394 (Firewire), special adapter, wireless transmission, LAN attachment, an internet connection or the like. A display device 42 may also be connected to system bus 53 via an interface, such as a video adapter 69. In addition to the monitor, personal computers typically include other peripheral output devices (not shown), such as speakers and printers.

The computer 40 may operate in a networked environment using logical connections to one or more remote computers 74. Remote computer 74 may be another personal computer, a server, a client, a router, a network PC, a peer device, a mainframe, a personal digital assistant, an Internet-connected mobile telephone, an Internet-connected camera, or other common network node. While a remote computer 74 typically includes many or all of the elements described above relative to the computer 40, only a display and keyboard 75 has been illustrated in the figure. The logical connections depicted in the figure include a local area network (LAN) 76 and a wide area network (WAN) 77. Such networking environments are commonplace in offices, enterprise-wide computer networks, intranets, and the Internet.

When used in a LAN networking environment, the computer 40 is often connected to the local area network 76 through a network interface or adapter 78. When used in a WAN networking environment, the computer 40 typically includes a modem 79 or other means for establishing high-speed communications over WAN 77, such as the Internet. A modem 79, which may be internal or external, is connected to system bus 53 via serial port interface 68. In a networked environment, program modules depicted relative to personal computer 40, or portions thereof, may be stored in the remote memory storage device 75. It will be appreciated that the network connections shown are exemplary and other means of establishing a communications link between the computers may be used. A number of program modules may be stored on hard disk 57, magnetic disk 59, optical disk 61, ROM 54, or RAM 55, including an operating system 65 and browser 66.

The devices shown in FIG. 2 should not imply that the invention has architectural limitations. For example, those skilled in the art will appreciate that the present invention may be implemented in other computer system configurations, including hand-held devices, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 3:
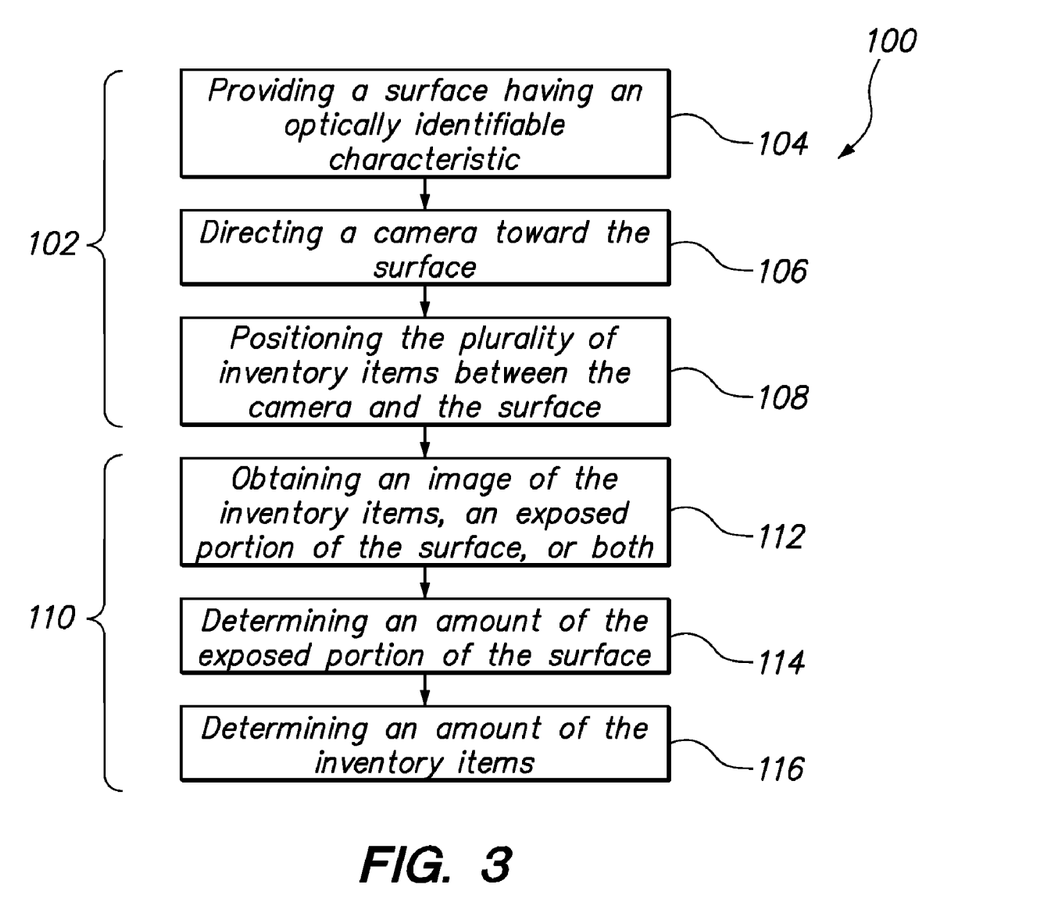
FIG. 3 is a logic diagram of a method for monitoring inventory in accordance with another embodiment of the invention.

FIG. 3 is a logic diagram of a method 100 for monitoring inventory in accordance with another embodiment of the invention. The method begins with certain setup steps 102, including providing a surface having an optically identifiable characteristic that is distinct from an inventory item (step 104), directing a camera toward the surface (step 106), and positioning at least one unit of an inventory item between the camera and the surface (step 108). Having completed the setup steps 102, the system is able to perform inventory monitoring steps 110. The inventory monitoring steps 110 include using the camera to obtaining an image of the inventory items, an exposed portion of the surface or both (step 112), determining an amount of the exposed portion of the surface (step 114), and determining the number of units of the inventory item by comparing a known amount of the entire surface to the determined amount of the exposed portion of the surface (step 116). Depending upon the objectives of the inventory monitoring, step 116 could emphasize a determination of the number of units remaining in inventory or it could emphasize a determination of the number of units that have been removed.

Figure 4:
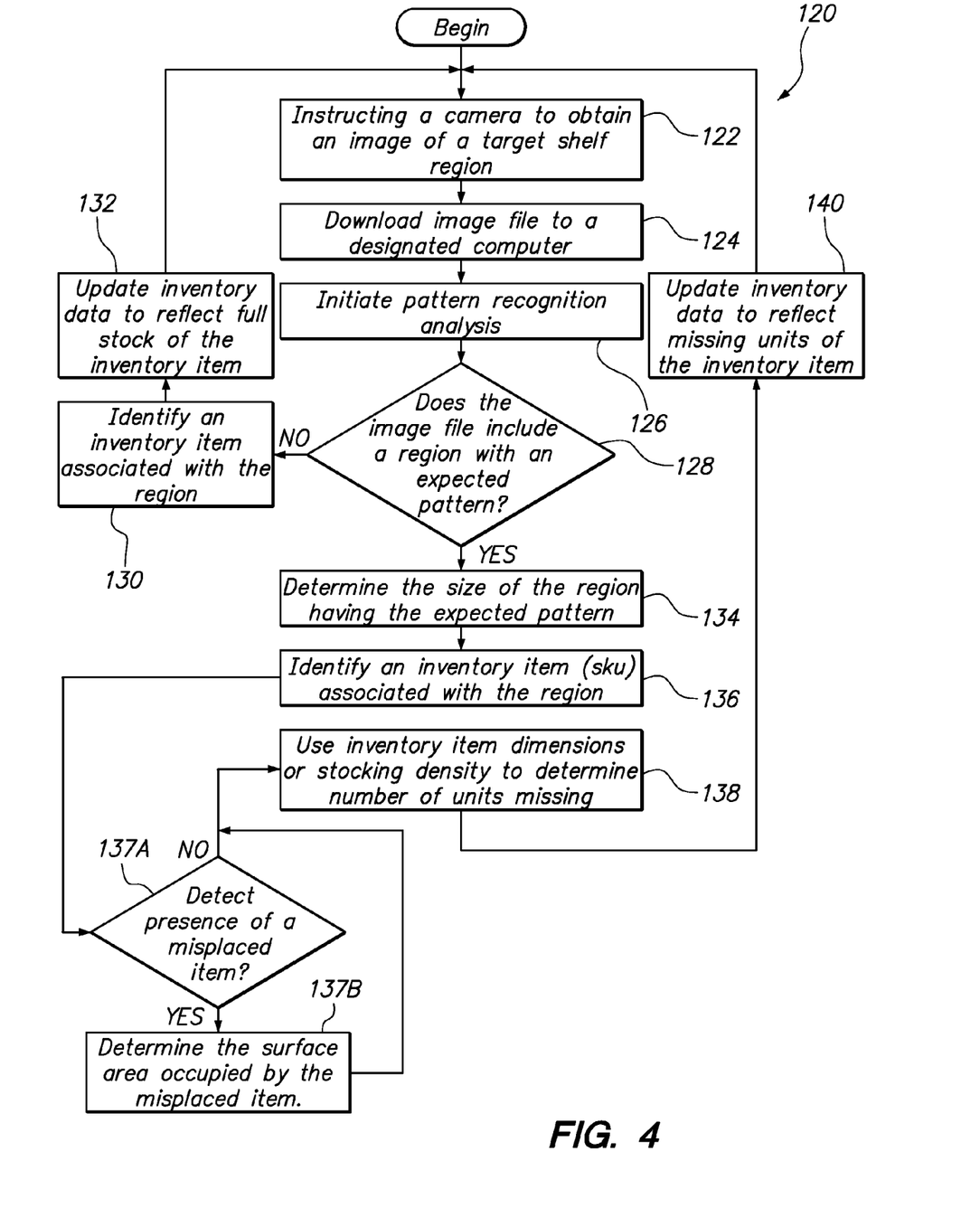
FIG. 4 is a logic diagram of a computer program product for executing a method for monitoring inventory.

FIG. 4 is a logic diagram of a computer program product for executing a method 120 for monitoring inventory. This method may be performed by the system of FIGS. 1 and 2. Accordingly, a camera is instructed to obtain an image of a target shelf region (step 122), the image file or data is downloaded to a designated computer (step 124), and pattern recognition analysis is initiated (step 126). The pattern recognition analysis results in a determination whether the image file includes a region with an expected pattern (step 128). This may involve searching the image for one or more expected patterns or colors (such as a blue background) or searching a database for patterns (such as a barcode) found within the image. If the image does not include an expected pattern, then the method identifies an inventory item associated with the region (step 130) and updates the inventory data to reflect full stock of the identified inventory item (step 132). Alternatively, if the image includes an expected pattern then this indicates that some of the inventory item has been removed. Accordingly, the method determines the size of the region having the expected pattern (step 134) and identifies an inventory item associated with the region (step 136). An inventory item may identified by using a lookup function through an existing database that lists the locations of each inventory item in the facility. The camera location, orientation, zoom status, and/or unique markings on the shelf surface may be used to determine the shelf location. Then, the database is searched to identify the inventory item expected at the particular shelf location. Having identified the inventory item, the same or different database may be accessed to obtain the dimensions, stocking density and optically identifiable characteristics of the inventory item. Misplaced items may be detected by scanning the image for items that do not match optically identifiable characteristics of the surface or the expected inventory item. If a misplaced item is detected (step 137A), then the surface area occupied by the misplaced item is determined (step 137B). The number of units missing may then be determined (step 138), such as by obtaining the sum of the surface area that is exposed and the surface area occupied by the misplaced item, subtracting this sum from the entire surface are associated with the inventory item, then dividing the difference by the relevant dimensions of the expected inventory item. Finally, the method updates an inventory data file to reflect missing units of the inventory item (step 140).

It should be recognized that the method may be utilized for purposes other than generating a traditional inventory report. For example, the method of monitoring inventory may detect abnormal or suspicious changes in inventory that suggest theft. Accordingly, when large quantities of a single inventory item are taken at once, such as ten packages of razor blades or cold medicine, then the system or method may issue an alert for investigation or intervention.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for monitoring inventory, comprising:
providing a surface having an optically identifiable characteristic that is distinct from an inventory item;
directing a camera toward the surface;
positioning at least one unit of the inventory item between the camera and the surface;
using the camera to obtaining an image of the at least one unit, an exposed portion of the surface or both;
determining an amount of the exposed portion of the surface; and
determining the number of units of the inventory item present by comparing a known amount of the entire surface and the determined amount of the exposed portion of the surface.

2. The method of claim 1, further comprising:
identifying the location of the exposed portion of the shelf; and
identifying the inventory item previously positioned at the location of the exposed portion of the surface.

3. The method of claim 2, wherein the location of the exposed portion of the shelf is determined relative to a known position of the camera when the image was obtained.

4. The method of claim 2, wherein the optically identifiable characteristic is unique to the location of the shelf that is associated with the inventory item.

5. The method of claim 1, wherein the optically identifiable characteristic includes at least one discrete element selected from the group consisting of patterns of contrasting lines, patterns of contrasting shapes, bar codes, stickers, structural features of the shelf, or combinations thereof.

6. The method of claim 1, wherein the optically identifiable characteristic is a uniform characteristic selected from the group consisting of color, texture, and combinations thereof.

7. The method of claim 1, wherein the optically identifiable characteristic includes at least one uniquely identifiable label.

8. The method of claim 7, further comprising:
establishing the location of the at least one uniquely identifiable label before positioning the at least one unit of the inventory item between the camera and the surface containing the at least one uniquely identifiable label.

9. The method of claim 8, further comprising:
associating an inventory item with the location of the at least one uniquely identifiable label.

10. The method of claim 1, wherein the surface comprises a retro-reflective material and an infrared light illumination source is positioned substantially near the lens of the camera to cause a strong return of light reflecting off the retro-reflective material.

11. The method of claim 1, wherein the at least one unit of the inventory item includes a plurality of units.

12. The method of claim 11, wherein a plurality of units of a plurality of different inventory items are positioned between the camera and the surface, wherein the camera obtains an image of the units remaining in the position and an exposed portion of the surface, and wherein the number of units of each inventory item remaining in the position is determined.

13. The method of claim 1, further comprising:
identifying an optically identifiable characteristic of the inventory item that is expected at the position on the surface;
detecting the presence of a misplaced item positioned on the surface that does not match the optically identifiable characteristic of the expected inventory item; and
excluding the misplaced item from the number of units of the inventory item present.

14. The method of claim 13, wherein the step of excluding the misplaced item includes determining the surface area occupied by the misplaced item, and wherein the step of determining the number of units of the inventory item present includes comparing the known amount of the entire surface and the sum of the surface area occupied by the misplaced item and the determined amount of the exposed portion of the surface.

15. A system for monitoring inventory, comprising:
a structure having a surface including an optically identifiable characteristic that is distinct from an inventory item;
a camera directed toward the structure to obtain an image that includes at least one unit of the inventory item positioned between the camera and the surface, an exposed portion of the surface, or both; and
a computer system including a processor and a computer readable medium including computer usable program code for using the camera to obtain an image of the at least one unit of the inventory item, an exposed portion of the surface or both, determine an amount of the exposed portion of the surface, and determine the number of units of the inventory item present by comparing a known amount of the entire surface and the determined amount of the exposed portion of the surface.

16. The system of claim 15, wherein the computer readable medium further includes computer usable program code for identifying the location of the exposed portion of the shelf, and identifying the inventory item previously positioned at the location of the exposed portion of the shelf.

17. The system of claim 15, wherein the optically identifiable characteristic is unique to the location of the shelf associated with the inventory items.

18. The system of claim 15, wherein the optically identifiable characteristic includes at least one discrete element selected from the group consisting of patterns of contrasting lines, patterns of contrasting shapes, bar codes, stickers, structural features of the shelf, or combinations thereof.

19. The system of claim 15, wherein the optically identifiable characteristic is a uniform characteristic selected from the group consisting of color, texture, and combinations thereof.

20. The system of claim 15, wherein the optically identifiable characteristic includes at least one uniquely identifiable label.

21. The system of claim 20, wherein the computer readable medium further includes computer usable program code for establishing the location of the at least one uniquely identifiable label before the at least one unit of the inventory item is positioned between the camera and the surface containing the at least one uniquely identifiable label.

22. The system of claim 15, wherein the computer readable medium further includes computer usable program code for associating an inventory item with the location of the at least one uniquely identifiable label.

23. The system of claim 15, further comprising:
an infrared light illumination source positioned substantially near the lens of the camera, wherein the surface comprises a retro-reflective material.

24. The system of claim 15, wherein the at least one unit of the inventory item includes a plurality of units.

25. The system of claim 24, wherein a plurality of units of a plurality of different inventory items are positioned between the camera and the surface, wherein the camera obtains an image of the units remaining in the position and an exposed portion of the surface, and wherein the number of units of each inventory item remaining in the position is determined.

* * * * *